No. 849,487. PATENTED APR. 9, 1907.
A. J. MORSE.
CLUTCH.
APPLICATION FILED DEC. 6, 1905.
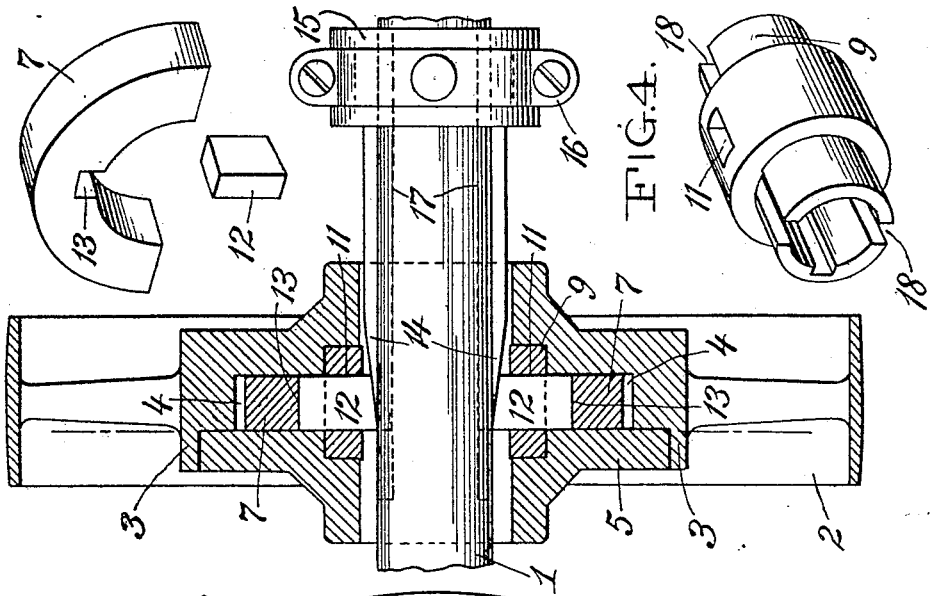
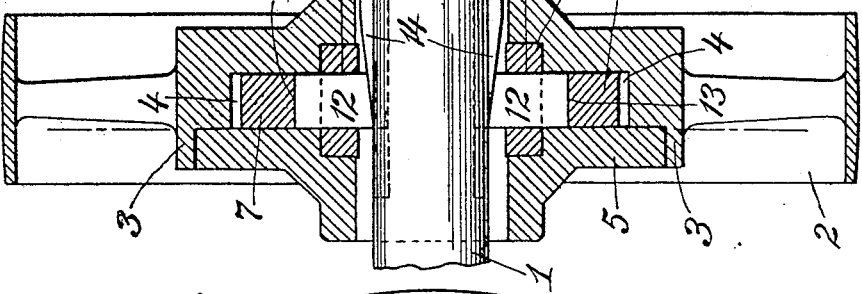
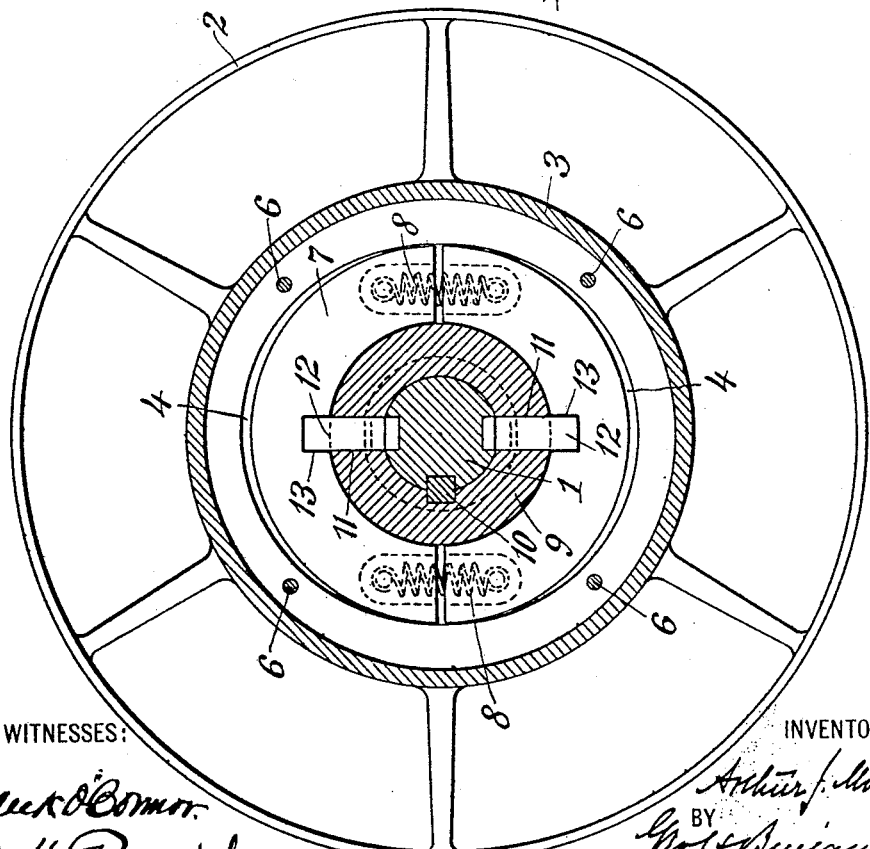
WITNESSES:
INVENTOR
Arthur J. Morse
BY
ATTORNEY

UNITED STATES PATENT OFFICE.

ARTHUR JACOB MORSE, OF TORRINGTON, CONNECTICUT, ASSIGNOR OF ONE-HALF TO ADELBERT P. HINE, OF TORRINGTON, CONNECTICUT.

CLUTCH.

No. 849,487.      Specification of Letters Patent.      Patented April 9, 1907.

Application filed December 6, 1905. Serial No. 290,621.

*To all whom it may concern:*

Be it known that I, ARTHUR JACOB MORSE, a citizen of the United States, residing at Torrington, county of Litchfield, State of Connecticut, have invented certain new and useful Improvements in Clutches, of which the following is a specification.

My invention relates generally to transmission-gearing, and particularly to clutch mechanism employed in connection therewith.

The object of the invention is to provide an extremely simple and effective clutch of the positive locking type capable of transmitting motion when rotating in either direction and which may be gradually or instantly thrown in or out under any load without appreciable shock, strain, or wear upon the coacting members thereof.

A clutch construction suitable for carrying my invention into effect is illustrated in the accompanying drawings, in which—

Figure 1 is a sectional view taken transversely of the driving-shaft. Fig. 2 is a similar view taken longitudinally thereof. Fig. 3 is a detail perspective view showing parts of one of the clutch members, and Fig. 4 is a similar view of the guide-sleeve or bushing for the clutch-operating device.

Referring now to the drawings, 1 represents a shaft, and 2 a pulley mounted thereon. For purposes of description the shaft 1 will be herein considered the driving member, and the pulley 2 the driven member; but it will be understood that the function of these parts may be reversed, if desired, as the clutch as herein embodied is of the positive locking type designed to transmit motion when rotating in either direction.

The hub 3 of the pulley or driven member 2 is enlarged and bored out to provide an annular chamber or recess 4 around the driving-shaft in which the clutch parts are mounted, such chamber or recess being closed by a cap 5, removably secured by screws 6.

The chamber 4, as shown in Fig. 1, is given a slightly elliptical form or is otherwise formed so that opposite symmetrical portions shall be eccentrically disposed relatively to the axis of the driving member, and fitted to rotate freely therein there is a ring 7, which, as will appear later on, serves, in effect, as an extension or part of the driving-shaft.

The particular construction of the ring is unimportant, it being essential only that it shall be such as to permit requisite expansion and contraction thereof relatively to a coöperating element, herein conveniently shown as the eccentrically-disposed wall of the chamber 4.

Preferably a sectional ring is employed, which is divided centrally or formed in halves, as shown in Figs. 1 and 3, the chamber 4 being correspondingly formed with semicircular ends. These ring-sections may be set loosely in the chamber 4 or yieldingly connected by springs 8 or other means tending to hold the same in closed relation about the driving-shaft and clear of the wall of the chamber 4 when the clutch is running free.

The connection between the ring and the driving-shaft is such as to cause these parts to rotate together in either direction and at the same time permit expansion of the ring—that is to say, movement of the sections thereof radially outward in opposite directions into locked relation with the recess of the driven member when the clutch is thrown in. For this purpose I preferably employ a construction and arrangement of parts substantially as shown. When the clutch-operating device is mounted exteriorly of the driving-shaft, a sleeve or bushing 9 is interposed between the shaft and driven member and is secured to rotate with the shaft by a key 10. At diametrically opposite points the sleeve is provided with radially-disposed slots 11 to receive pins or blocks 12, which are fitted loosely therein, with their outer ends entering notches 13, formed in the ring-sections, and their inner ends resting upon taper projections 14 of a collar 15 of the clutch-operating device.

The collar 15 may be controlled in the usual manner by a yoked lever 16 or otherwise and is slidingly mounted upon the driving-shaft. Slots 17, formed in the shaft, register with similar slots 18 in the bushing to receive the taper projections 14 of the sliding collar, the arrangement being such that when the collar is shifted toward the left as viewed in Fig. 2 the radially-disposed blocks 12 will be cammed outward, separating the ring-sections, as above described, and establishing a driving connection between the driving and driven members of the clutch. Upon reversing the movement of the collar the ring-sections will be moved into closed relation by the action of the springs 8 or if springs are not employed by the cam-like action of the wall of the recess, assuming that the rotation of the driving member is continued during such reversal.

By making the chamber 4 sufficiently tight the clutch may be run in oil and all friction and wear on the parts thereby greatly reduced.

The operation, advantages, &c., of my invention will be apparent from the foregoing description.

Having thus described my invention, I claim—

1. A clutch comprising a rotatable member provided with a chamber or recess having opposite symmetrical portions eccentrically arranged relatively to its axis, a ring normally rotatable in the recess, and means for expanding the ring to substantially fit and fill said recess.

2. A clutch comprising a rotatable member provided with a chamber or recess having opposite symmetrical portions eccentrically arranged relatively to its axis, a sectional ring normally rotatable in the recess, and means for moving the ring-sections radially of said axis to substantially fit and fill said recess.

3. A clutch comprising a rotatable member recessed to form an annular chamber the opposing walls of which are eccentrically disposed relatively to each other, a two-part ring normally rotatable within the recess, and means for separating the parts of the ring during rotation thereof to substantially fit and fill said recess.

4. A clutch comprising a rotatable member having an elliptical chamber having opposite semicircular portions symmetrically disposed with relation to the axis of the clutch, an expansible member normally rotating free within said chamber and when expanded substantially fitting and filling said chamber, and means for expanding said member during rotation thereof.

5. A clutch comprising a rotatable member having an elliptical chamber portions of which are eccentric to its axis, a sectional ring normally contracted and rotating free within said chamber, said sections conforming in number, size and configuration to the eccentric portions of said chamber, and means for forcing said sections into said eccentric portions to substantially fit and fill said chamber.

6. A clutch comprising a driving member, a driven member, said members combining to form an annular chamber the opposing walls of which are eccentrically disposed relatively to each other, a sectional ring normally rotatable within the chamber and each section corresponding in size and configuration to the eccentrically-disposed walls, and means for expanding said ring to substantially fit and fill said chamber.

7. A clutch comprising a driving member, a driven member, said members combining to form an intervening annular chamber open at one side and having the opposing walls thereof eccentrically disposed relatively to each other, a removable cap closing the open side of the chamber, a sectional clutch-ring normally rotatable within the chamber, and means for expanding said clutch-ring to substantially fit and fill said chamber.

8. A clutch comprising a rotatable member provided with a diametrically-elongated recess, a two-part ring normally rotatable within the recess, a sleeve secured to the driving-shaft and provided with radially-disposed members coacting to separate the ring-sections, said ring-sections when separated substantially fitting and filling said recess, and means for operating said radially-disposed members during rotation thereof.

9. A clutch comprising a rotatable member provided with a non-circular recess, a sectional ring normally rotatable within the recess and expansible to substantially fit and fill said recess, means for yieldingly uniting the ring-sections, radially-disposed members coacting with the ring-sections, and means for imparting rotary and radial movement to said sections through the radially-disposed members.

10. A clutch comprising a rotatable member recessed to form an oval chamber having semicircular ends, a normally circular two-part ring in said chamber and each part substantially corresponding in size and configuration to the semicircular ends of said chamber, and means for separating the parts of said ring during rotation thereof to substantially fit and fill said chamber.

11. A clutch comprising a rotatable member recessed to form an oval chamber having semicircular ends, a normally circular two-part ring in said chamber, each part substantially corresponding in size and configuration to the semicircular ends of said chamber, and means for increasing the diameter of said ring in the direction of the long diameter of said chamber and in an amount greater than the short diameter of said chamber.

In testimony whereof I affix my signature in the presence of two witnesses.

ARTHUR JACOB MORSE.

Witnesses:
  W. H. PUMPHREY,
  CHARLES D. GREEN.